(12) United States Patent
Kanda et al.

(10) Patent No.: US 7,263,281 B2
(45) Date of Patent: Aug. 28, 2007

(54) INFORMATION RECORDING/REPRODUCTION METHOD

(75) Inventors: Hiroshi Kanda, Sukumo (JP); Eiji Masuda, Onsen-Gun (JP)

(73) Assignee: Matsushita Electric Industrial Co., Ltd., Kadoma-Shi (JP)

( * ) Notice: Subject to any disclaimer, the term of this patent is extended or adjusted under 35 U.S.C. 154(b) by 958 days.

(21) Appl. No.: 10/250,719

(22) PCT Filed: Oct. 23, 2002

(86) PCT No.: PCT/JP02/10974

§ 371 (c)(1),
(2), (4) Date: Jul. 8, 2003

(87) PCT Pub. No.: WO03/036640

PCT Pub. Date: May 1, 2003

(65) Prior Publication Data

US 2004/0052500 A1    Mar. 18, 2004

(30) Foreign Application Priority Data

Oct. 26, 2001  (JP)  ............................. 2001-329576

(51) Int. Cl.
H04N 5/00    (2006.01)
H04N 5/91    (2006.01)

(52) U.S. Cl. .................... 386/125; 386/126; 386/95

(58) Field of Classification Search ........ 386/125–126, 386/95
See application file for complete search history.

(56) References Cited

U.S. PATENT DOCUMENTS 6,453,115 B1 * 9/2002 Boyle ......................... 386/68
6,684,026 B2 * 1/2004 Kanota et al. ............... 386/111
6,775,466 B1 * 8/2004 Koshino et al. ............. 386/125
2003/0190144 A1 * 10/2003 Kuno et al. .................. 386/68

FOREIGN PATENT DOCUMENTS

| JP | 10-049991 A1 | 2/1998 |
|----|--------------|--------|
| JP | 10-302390    | 11/1998 |
| JP | 2000-285595  | 10/2000 |
| JP | 2000-350139  | 12/2000 |

* cited by examiner

Primary Examiner—Thai Q. Tran
Assistant Examiner—Daquan Zhao
(74) Attorney, Agent, or Firm—Burr & Brown

(57) ABSTRACT

According to an information recording/reproducing method by which, at recording or reproduction of data, the data are temporarily stored in a memory to perform the recording or reproduction, when recording or reproduction of the data stored in the memory is performed with dividing data, recording or reproduction of subsequent data is performed without dividing the data, and when recording or reproduction of the data stored in the memory is performed without dividing data, recording or reproduction of subsequent data is performed with divided the data. Accordingly, in a disc device that records or reproduces video on/from a disc, when data stored in a memory is recorded or reproduced without dividing the data and thereafter subsequent recording or reproduction is performed, a rotational delay would not occur, and the increase in the recording/reproduction execution time resulting from the rotational delay is avoided, whereby the data recording/reproduction execution time can be optimized.

4 Claims, 12 Drawing Sheets

Fig.2

| Recording/ reproduction order | Sector No. | Data |
|---|---|---|
| 201 | sector 1 | 512 Bytes |
| 202 | sector 2 | 512 Bytes |
| 203 | sector 3 | 512 Bytes |
| ⋮ | ⋮ | ⋮ |
| 234 | sector 34 | 512 Bytes |
| 235 | sector 35 | 512 Bytes |
| ① | sector 36 | 512 Bytes |
| 2 | sector 37 | 512 Bytes |
| ⋮ | ⋮ | ⋮ |
| 198 | sector 233 | 512 Bytes |
| 199 | sector 234 | 512 Bytes |
| 200 | sector 235 | 512 Bytes |

※ DV signal ; 1 frame = 120KBytes (235 sectors)
                1 sector = 512Bytes

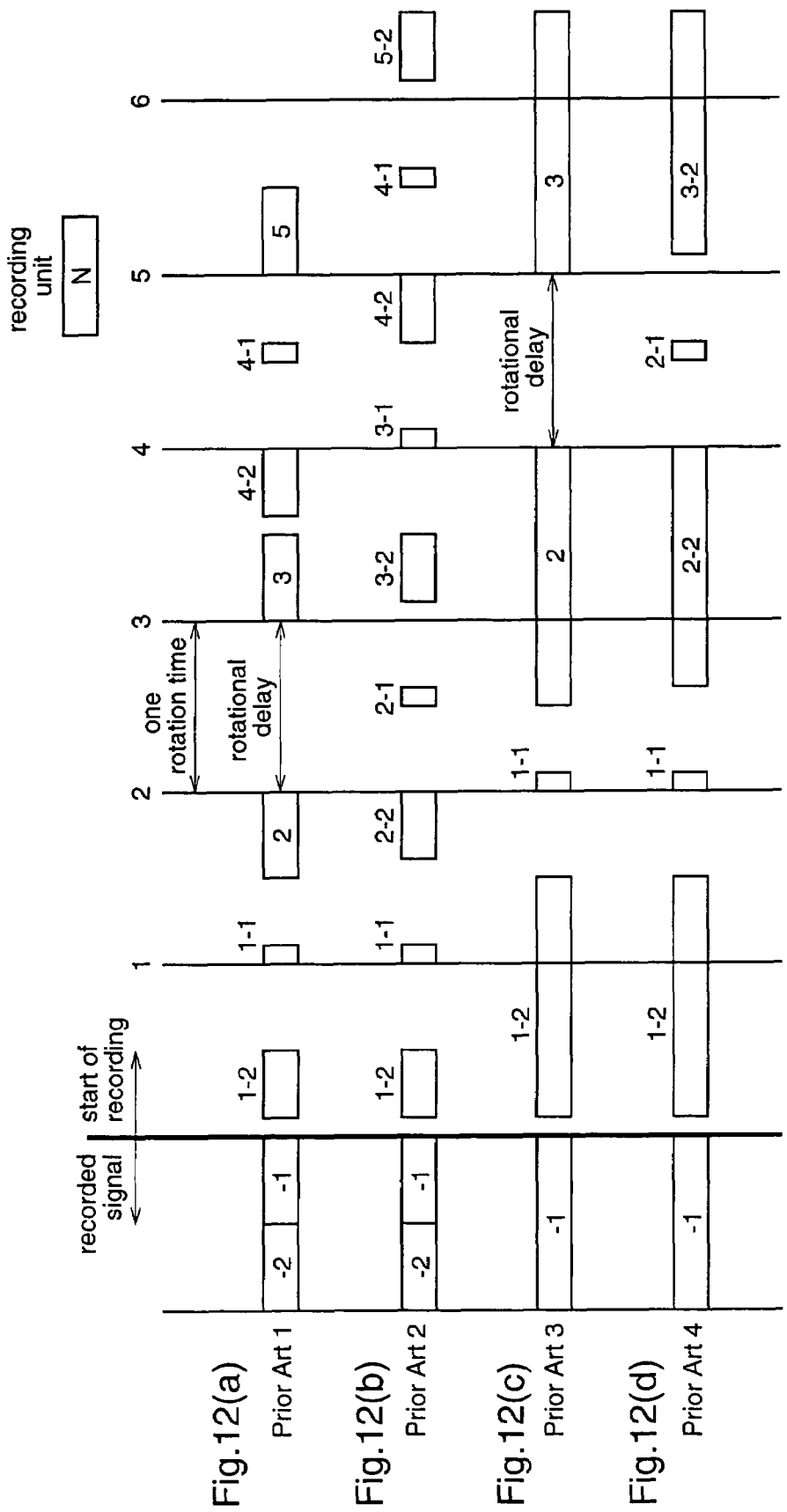

INFORMATION RECORDING/REPRODUCTION METHOD

TECHNICAL FIELD

The present invention relates to an information recording/reproducing method and, more particularly, to an information recording/reproducing method that is carried out in an apparatus for recording/reproducing information on/from a disc information carrier.

BACKGROUND ART

When continuous image data are to be recorded or reproduced by a disc device that records video signals in a DV (Digital Video) format on a disc, or reproduces video signals in the DV format from the disc, the data are recorded/reproduced on/from the disc surface, from an outer radius toward an inner radius or from an inner radius toward an outer radius, in the order of LBA (Logical Block Address), while changing heads and discs.

At this time, a rotational delay resulting from overhead of commands or caused by retry due to an error sometimes occurs at the recording or reproduction, and thus the recording or reproduction may take much time. In such case, when consecutive DV signals are to be recorded or reproduced, and the recording or reproduction cannot be performed within 33.34 mS corresponding to a recording or reproduction time of one frame, this frame cannot be recorded or reproduced, thereby resulting in frame dropping.

To overcome this problem, there are "An information recording/reproducing apparatus and an information recording/reproducing method", which have been already disclosed in Japanese Published Patent Application No. 2000-350139.

FIG. 1 is a block diagram illustrating an information recording/reproducing apparatus, and FIG. 2 is a diagram showing a frame memory configuration of the information recording/reproducing apparatus. FIGS. 8 to 11 are flowcharts showing recording methods in conventional information recording/reproducing methods. FIG. 12 are diagrams showing execution times in cases where signals are recorded on a disc surface by the conventional information recording/reproducing method.

Here, in FIG. 12, the units of recording that have already been recorded are shown by negative numbers, and when the unit of recording is divided at the recording, the divided units are shown by numbers with subscripts such as 1-1 or 1-2.

As shown in FIG. 1, this conventional information recording/reproducing apparatus comprises a 1394 interface 1 that receives a serial signal from a DV device 7 and converts the signal into a parallel signal; a disc controller 2 that temporarily stores the parallel signal into a frame memory 6 to control the flow of the signal, and modulates or demodulates the DV signal to be recorded/reproduced on/from a disc 4 (information recording medium); a recording/reproducing circuit 3 that records the DV signal on the disc 4 or reproduces the DV signal from the disc 4; and a CPU 5 that controls the disc controller 2. When a DV signal that is inputted from the DV device 7 and received through the 1394 interface 1 is to be recorded on the disc 4, the DV serial signal is once converted into a parallel signal by the 1394 interface 1. Thereafter, one frame (235 sectors) of data to be recorded are stored in the frame memory 6 by the disk controller 2 in a format in which a sector number is assigned to each sector, as shown in FIG. 2 that is a diagram illustrating a frame memory configuration of the conventional information recording/reproducing apparatus. The stored data to be recorded are modulated by the disc controller 2, and then recorded on the disc 4 by the recording/reproducing circuit 3.

At this time, according to the information recording/reproducing method of Prior Art 1 as shown by a flowchart of FIG. 8 that illustrates a DV signal recording method in a conventional information recording/reproducing method, when the DV signal is to be recorded on a disc (information recording/reproducing carrier), the data to be recorded are temporarily stored in the memory (step S1), and a LBA(S) as a recording start LBA is set (step S2). Then, the number of frames to be recorded (Frame(R)) is set (step S3). Thereafter, when the recording is to be performed, initially from a position on the disc at which a command is issued and the recording is permitted (steps S12 to S14), recording of data corresponding to LBA of this position is performed (steps S5 to S6), and then data that have not been recorded are recorded thereafter at LBAs on the disc corresponding to the data (steps S7 to S8). These processes are repeated until the number of recorded frames reaches the set number of frames to be recorded (steps S9 to S11), whereby an increase in the recording execution time resulting from the rotational delay, which is caused by the command overhead at the recording of DV signals can be avoided.

Further, according to an information recording/reproducing method of Prior Art 2 as shown by a flowchart of FIG. 9 that illustrates a DV signal recording method of the conventional information recording/reproducing method, when a DV signal is to be recorded on a disc (information recording medium), the data to be recorded are temporarily stored in a memory (step S1), and a LBA(S) as a recording start LBA is set (step S2). Then, the number of frames (Frame(R)) to be recorded is set (step S3). Thereafter, when recording is to be performed, a LBA for starting data recording is previously set at a larger value than a LBA at which a command is issued and recording is permitted (step S4), then from a position on the disc corresponding to the LBA at which the command is issued and the recording is started, recording of data corresponding to the LBA is performed (steps S5 to S6), and data that have not been recorded are recorded thereafter at LBAs on the disc corresponding to the data (steps S7 to S8). These processes are repeated until the number of recorded frames reaches the set number of frames to be recorded (steps S9 to S11). Accordingly, an apparatus and a method for detecting a LBA at which a command is issued and the recording is permitted are dispensed with, whereby rotational delay that is caused by command overhead can be eliminated with a simpler configuration.

On the other hand, an information recording/reproducing method of Prior Art 3 as shown by a flowchart of FIG. 10 that illustrates a data recording method of a conventional information recording/reproducing method can reduce a recording execution time also in cases where the type of a signal to be recorded is different from the DV signal, and the number of sectors in the signal to be recorded is different from that of the DV signal in the information recording/reproducing method of Prior Art 1 as shown in FIG. 8 (step S15).

Further, an information recording/reproducing method of Prior Art 4 as shown by a flowchart of FIG. 11 that illustrates a data recording method of a conventional information recording/reproducing method can reduce recording execution time also in cases where the type of a signal to be recorded is different from the DV signal and the number of sectors in the signal to be recorded is different from that of the DV signal in the information recording/reproducing method of Prior Art 2 as shown in FIG. 9 (step S15).

However, as in the above-mentioned information recording/reproducing method of Prior Art 1 or 3, when from a position on the disc at which a command is issued and recording or reproduction is permitted, recording or reproduction of data corresponding to a LBA of that position is performed, and then data that have not been recorded or reproduced are recorded or reproduced thereafter at LBAs on the disc corresponding to the data, there are cases where one rotational delay occurs after data stored in the frame memory is recorded without being divided, as shown by Prior Art 1 of FIG. 12(a) or Prior Art 3 of FIG. 12(c) (after the recording unit 2 or 4), and optimization of the recording time cannot be sufficiently performed.

In addition, as in the above-mentioned information recording/reproducing method of Prior Art 2 or 4, when a LBA for starting recording or reproduction of data is previously set at a larger value than a LBA at which a command is issued and the recording or reproduction is permitted, then from a position on the disc corresponding to a LBA at which a command is issued and the recording or reproduction is started, recording or reproduction of data corresponding to the LBA is performed, and then data that have not been recorded or reproduced are thereafter recorded or reproduced on/from LBAs on the disc corresponding to the data, the data stored in the memory is always divided to be recorded as shown in Prior Art 2 of FIG. 12(b) or Prior Art 4 of FIG. 12(d). Accordingly, this method is less effective for reduction in the recording time in cases where continuous recording or reproduction is performed.

The present invention is made to solve the above-mentioned problems, and has for its object to provide an information recording/reproducing method that avoids an increase in recording/reproduction execution time resulting from a rotational delay, and reduces recording/reproduction time to optimize the recording/reproduction execution time.

DISCLOSURE OF THE INVENTION

According to the present invention, there is provided an information recording/reproducing method for recording a DV (Digital Video) signal on a disc as an information recording medium, or reproducing the DV signal from the disc on which the DV signal is recorded, comprising: handling the DV signal in units of frame, and temporarily storing the DV signals corresponding to the frames in a frame memory at the recording or reproduction; detecting completion of tracking when a command is issued; successively from a LBA (Logical Block Address) on the disc at which recording or reproduction of the DV signals is permitted, performing recording or reproduction of the DV signals corresponding to respective LBAs; and thereafter, for a part of the disc at which the recording or reproduction of the DV signals has not been performed, carrying out recording or reproduction operations for the DV signals corresponding to respective LBAs, in which after the DV signal stored in the frame memory is recorded or reproduced with being divided, the subsequent DV signal is recorded or reproduced without being divided, and after the DV signal stored in the frame memory is recorded or reproduced without being divided, the subsequent DV signal is recorded or reproduced with being divided.

Accordingly, no rotational delay occurs after the DV signal stored in the frame memory is recorded or reproduced without being divided, whereby an increase in the recording/reproduction execution time due to the rotational delay can be avoided and the recording/reproduction execution time of the DV signal can be optimized.

According to the present invention, there is provided an information recording/reproducing method for recording a DV signal on a disc as an information recording medium, or reproducing the DV signal from the disc on which the DV signal is recorded, comprising: handling the DV signal in units of frame, and temporarily storing the DV signals corresponding to the frames in a frame memory at the recording or reproduction; previously setting a LBA at which recording or reproduction of the DV signal is started, at a value that is larger than a LBA at which a command is issued and the recording or reproduction of the DV signal is permitted; from the set LBA on the disc, performing recording or reproduction of the DV signals corresponding to respective LBAs; and thereafter, for a part on the disc at which the recording or reproduction of the DV signals has not been performed, performing recording or reproduction of the DV signals corresponding to respective LBAs, in which after the DV signal stored in the frame memory is recorded or reproduced with being divided, the subsequent DV signal is recorded or reproduced without being divided, and after the DV signal stored in the frame memory is recorded or reproduced without being divided, the subsequent DV signal is recorded or reproduced with being divided.

Accordingly, also in cases where a LBA at which the recording or reproduction of the DV signal is started is previously decided, the process of recording or reproducing the DV signal stored in the frame memory with dividing the signal and the process of recording or reproducing the DV signal without dividing the signal are alternately carried out, thereby reducing the recording/reproduction time in a case where continuous recording or reproduction of the DV signals is performed.

According to the present invention, there is provided an information recording/reproducing method for recording data of a type that is different from a DV signal, on a disc as an information recording medium, or reproducing data of the different type from the DV signal from the disc on which the data is recorded, comprising: temporarily storing the data in a memory; detecting completion of tracking when a command is issued; successively from a LBA on the disc at which recording or reproduction of data is permitted, performing recording or reproduction of data corresponding to respective LBAs; and thereafter, for a part on the disc at which the recording or reproduction of data has not been performed, performing recording or reproduction operations for data corresponding to respective LBAs, in which after part of the data stored in the memory is recorded or reproduced with being divided, the subsequent data is recorded or reproduced without being divided, and after part of the data stored in the memory is recorded or reproduced without being divided, the subsequent data is recorded or reproduced with being divided.

Accordingly, no rotational delay occurs after the data stored in the memory is recorded or reproduced without being divided, whereby an increase in the recording/reproduction execution time due to the rotational delay is avoided and the recording/reproduction execution time for the data can be optimized.

According to the present invention, there is provided an information recording/reproducing method for recording data of a type that is different from a DV signal, on a disc as an information recording medium, or reproducing data of the different type from the DV signal, from the disc, comprising: temporarily storing the data in a memory; previously setting a LBA at which recording or reproduction of data is started, at a value that is larger than a LBA at which a command is issued and the recording or reproduction of data is permitted; from the set LBA on the disc, performing recording or reproduction of data corresponding to respective LBAS; and thereafter, for a part on the disc at which the recording or reproduction of data has not been performed, performing recording or reproduction of data corresponding to respective LBAs, in which after part of the data stored in the memory is recorded or reproduced with being divided, the subsequent data is recorded or reproduced without being divided, and after part of the data stored in the memory is recorded or reproduced without being divided, the subsequent data is recorded or reproduced with being divided.

Accordingly, also in cases where a LBA at which the recording or reproduction of data is started is previously decided, the process of recording or reproducing data stored in the memory with dividing the data and the process of recording or reproducing data without dividing the data are alternately carried out, thereby reducing the recording/reproduction execution time in a case where continuous recording or continuous reproduction of data is performed.

BRIEF DESCRIPTION OF THE DRAWINGS

FIG. 2 is a diagram showing a frame memory configuration of the information recording/reproducing apparatus.

FIG. 12 are diagrams showing execution times in cases where signals are recorded by a conventional information recording/reproducing method.

BEST MODE FOR CARRYING OUT THE INVENTION

Figure 1:
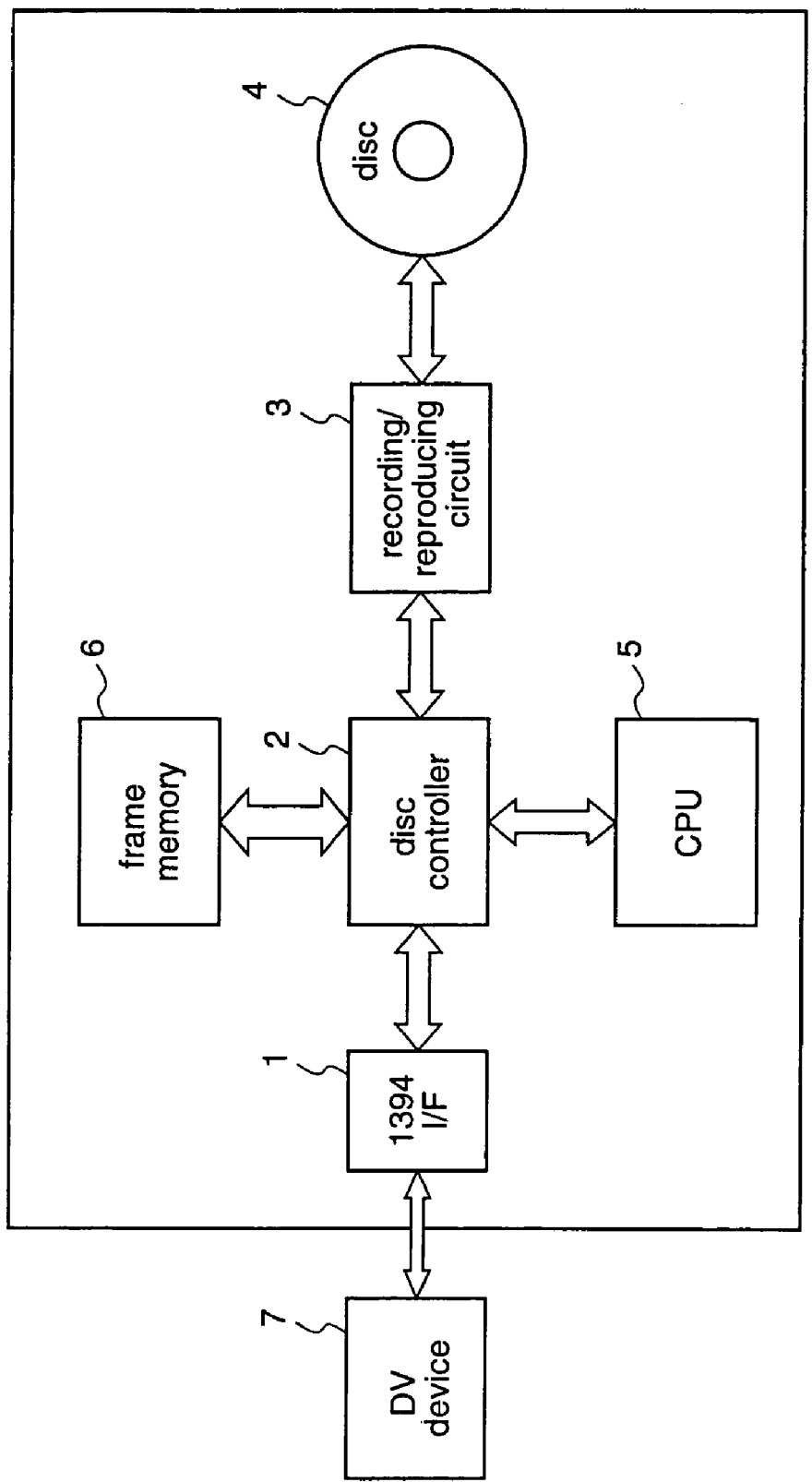
FIG. 1 is a block diagram illustrating a construction of an information recording/reproducing apparatus.

Hereinafter, embodiments of the present invention will be described in detail with reference to the drawings. Here, in the drawings, components having similar functions are denoted by the same reference numerals.

Embodiment 1

FIG. 1 is a block diagram illustrating a construction of an information recording/reproducing apparatus that records or reproduces DV signals.

In this figure, like the conventional information recording/reproducing apparatus, the information recording/reproducing apparatus of the first embodiment comprises a 1394 interface 1 that receives a serial signal from a DV device 7 and converts the serial signal into a parallel signal; a frame memory 6 that temporarily holds the parallel signal; a disc controller 2 that controls the flow of the signal, and modulates or demodulates the DV signal to be recorded or reproduced on/from a disc 4 (an information recording medium); a recording/reproducing circuit 3 that records or reproduces the DV signal on/from the disc 4; and a CPU 5 that controls the disc controller 2.

As shown in the block diagram illustrating the conventional information recording/reproducing apparatus that records or reproduces the DV signals, when a DV signal which is inputted from the DV device 7 through the 1394 interface 1 is to be recorded on the disc 4, the DV serial signal is once converted into a parallel signal by the 1394 interface 1 and thereafter one frame (235 sectors) of data to be recorded are stored in the frame memory 6 by the disc controller 2, in a format shown in FIG. 2 that illustrates the frame memory configuration, in which a sector number is assigned to each sector. The stored data are modulated by the disc controller 2 and then recorded on the disc 4 by the recording/reproducing circuit 3.

According to the first embodiment, in order to reduce recording time when continuous recording of DV signals is performed by the information recording/reproducing method in which the recording start sector position is decided by detecting a recordable position on the basis of tracking information, when a DV signal corresponding to a frame is recorded with being divided, then the subsequent DV signal is recorded without being divided, while when the DV signal is recorded without being divided, then the subsequent DV signal is recorded with being divided.

Figure 3:
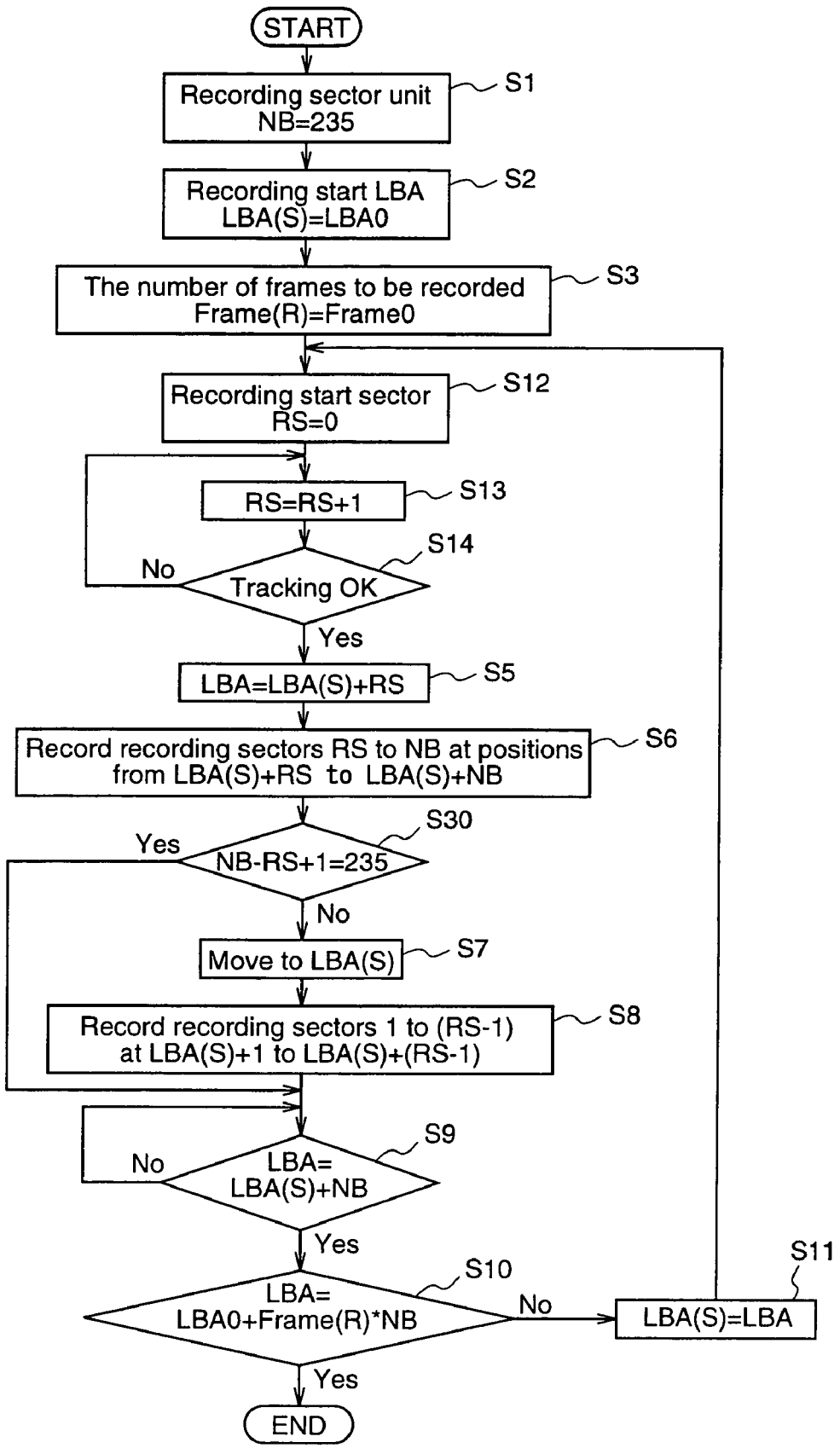
FIG. 3 is a flowchart showing a DV signal recording method in a case where a recording start sector position is decided by detecting a recordable position on the basis of tracking information, in an information recording/reproducing method according to a first embodiment of the present invention.

FIG. 3 is a flowchart showing a DV signal recording method of the information recording/reproducing method according to the first embodiment.

As shown in this figure, in step S1, the unit of recording sectors (NB) is set at 235 that is equal to the number of sectors in one frame. In step S2, a recording start LBA is set. In step S3, the number of frames to be recorded is set. In step S12, a recording start sector is set. Instep S13, the recording start sector is incremented. In step S14, completion of tracking is detected. In step S5, the LBA is located at a position at which recording of data can be started. In step S6, recording of data from the LBA position in step S5 at which the data recording can be started, up to the sector NB is performed. In step S30, it is judged whether 235 sectors corresponding to the number of sectors in one frame have been all recorded or not. In step S7, the operation returns to the recording start LBA when the result of the judgement in step S30 indicates that there are any sectors that have not been recorded. In step 8, the remaining sectors that have not been recorded are recorded. In step S9, the LBA is set at a position at which the recording of one frame has been finished. In step S10, it is judged whether all frames as many as the number of frames to be recorded, which has been set in step S3, have been recorded or not. Instep S11, when the judgement result of step S10 indicates that not all frames as many as the set number have been recorded, a LBA start position for recording the next frame is set.

Next, the recording operation in the information recording/reproducing method according to the first embodiment will be described with reference to FIG. 3.

The unit of recording sectors (NB) is set at 235 that is equal to the number of sectors in one frame (step S1), and then a LBA(S) as a recording start LBA is set (step S2). Next, the number of frames to be recorded (Frame(R)) is set (step S3). Thereafter, a recording start sector position RS in the frame to be recorded (235 sectors) is set at 0 (step S12), the sector position RS is incremented (step S13), it is judged whether tracking has been completed or not (step S14), and when the tracking has been completed, the recording is started from this recording start sector position (steps S5 to S6). Thereafter, it is judged whether the number of recorded sectors is 235 or not (step S30). When the 235 sectors have been all recorded, there is no sector to be recorded thereafter and thus the operation proceeds to step S9, while when there are any sectors that have not been recorded, these unrecorded sectors which are located forward of the recording start sector are recorded thereafter (steps S7 to S8). These processes are repeated until the number of recorded frames reaches the set number of frames to be recorded (steps S9 to S11).

As shown in FIG. 7(a) showing execution time at the recording of the DV signal on a disc surface, the above-mentioned information recording/reproducing method according to the first embodiment can prevent such a situation as in the Prior Art 1 shown in FIG. 12(a) (after recording unit 2) where a rotational delay occurs after recording of the DV signal stored in the frame memory is performed without dividing the signal, thereby reducing the recording time at the recording of the DV signal on the disc surface.

Further, in this first embodiment, the description has been given of the case of recording, but also in the case of reproduction, reproduction execution time can be reduced in a similar manner. Accordingly, by employing the information recording/reproducing method according to the present invention both in the recording and reproduction, the overall recording/reproduction execution time in the information recording/reproducing apparatus can be reduced.

Embodiment 2

According to an information recording/reproducing method of a second embodiment of the present invention, in order to reduce recording/reproducing time when continuous recording of a DV signal is carried out in the information recording/reproducing method by which a recordable sector position RS is previously decided and recording of the DV signal is performed with dividing the signal, a case where the DV signal stored in a frame memory is recorded with being divided and a case where the DV signal is recorded without being divided are alternately implemented.

Figure 4:
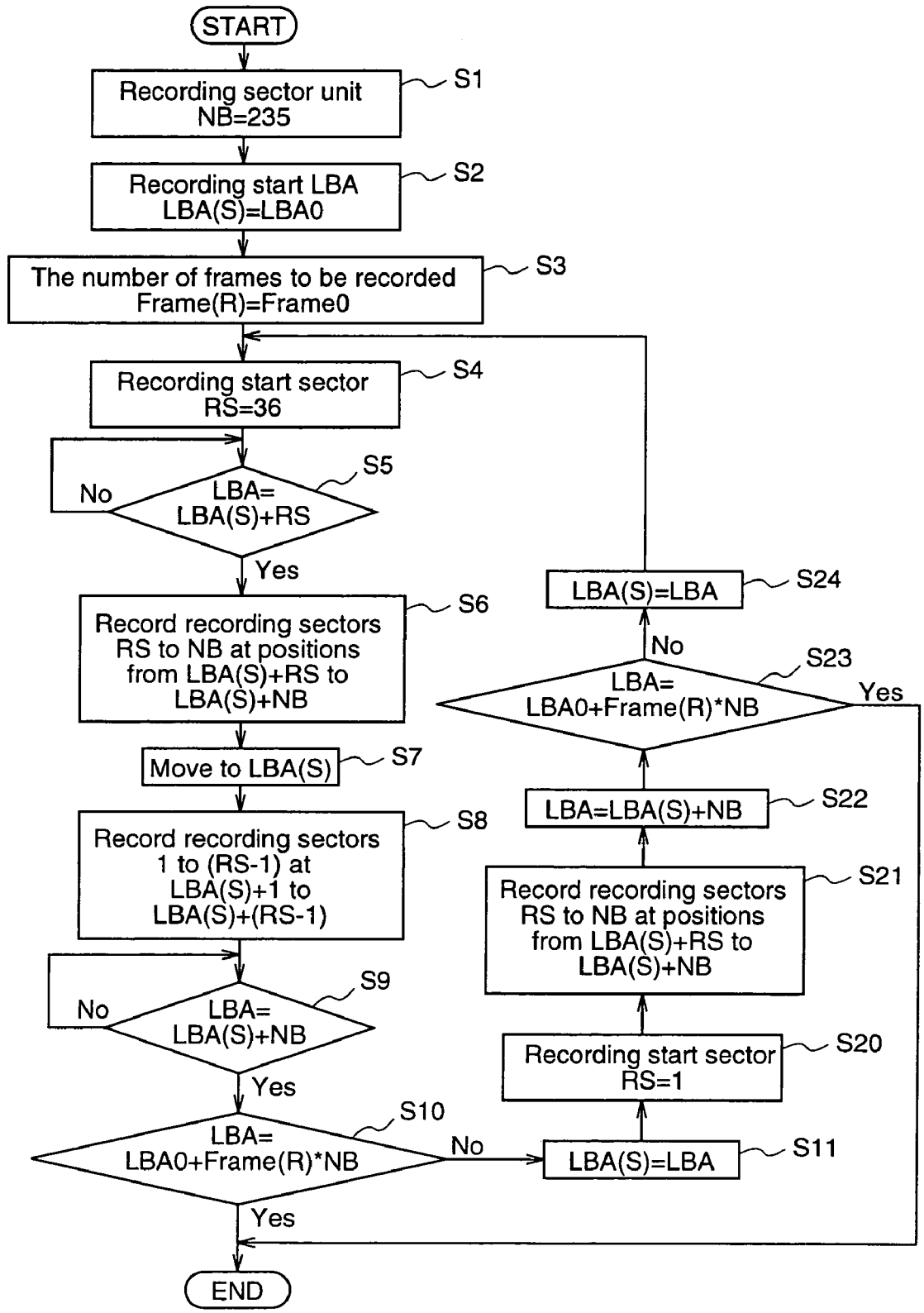
FIG. 4 is a flowchart showing a DV signal recording method in a case where a recordable sector position is previously decided and a DV signal is recorded with being divided, in an information recording/reproducing method according to a second embodiment of the present invention.

FIG. 4 is a flowchart showing a method for recording a DV signal by the information recording/reproducing method according to the second embodiment.

As shown in this figure, in step S1, the unit of recording sectors is set at 235 that is equal to the number of sectors in one frame. In step S2, a recording start LBA is set. In step S3, the number of frames to be recorded is set. In step S4, a recording start sector RS is previously decided. In this second embodiment, the recording start sector RS is set at sector 36. In step S5, a LBA for starting recording is set at the position of the recording start sector RS that is set in step S4. In step S6, recording from sector 36 that is set in step S4 up to sector 235 is executed. In step S7, the position of the LBA is moved to the position of the recording start LBA that is set in step S2, to record remaining sectors that have not been recorded. In step S8, the remaining sectors that have not been recorded are recorded. In the above-mentioned processes, the first frame is all recorded.

Then, in step S9, the position of the LBA is set at a position at which the recording of the first frame has been finished. In step S10, it is judged whether recording of frames as many as the number that has been set in step S3 has been finished or not and whether the present LBA is located at that position or not. In step S11, when the result of the judgement in step S10 indicates that not all of frames as many as the set number have been recorded, the position of a recording start LBA is set at the LBA position in step S9, to record the next frame, i.e., the second frame. In step S20, a sector position RS at which recording can be started in the second frame is set at 1. In step S21, all sectors in the second frame are recorded. In step S22, the present LBA position is located at a position at which the recording of the second frame has been finished. In step S23, it is judged whether or not the present LBA is at a position at which recording of frames as many as the number that has been set in step S3 has been finished. In step S24, when the result of the judgement in step S23 indicates that not all of the frames as many as the set number have been recorded, a recording start LBA for recording the next frame is set at the LBA position in step S22, thereby to prepare for the recording of the next frame.

Next, the operation in the information recording/reproducing method according to the second embodiment will be described with reference to FIG. 4.

Initially, the unit of recording sectors (NB) is set at 235 that is equal to the number of sectors in one frame (step S1), and then a LBA(S) as a recording start LBA is set (step S2). Then, the number of frames to be recorded (Frame(R)) is set (stepS3), and thereafter a recording start sector in a frame to be recorded (235 sectors) is previously set at a sector position RS at which recording can be started (step S4). Then, the recording is started from the recording start sector position (steps S5 to S6), and sectors which are located forward of the recording start sector and have not been recorded are recorded thereafter (steps S7 to S8). After the first frame is recorded in this way, the LBA is incremented to start recording of the second frame (steps S9 to S11). When the second frame is to be recorded next, initially a sector position RS at which the recording can be started is set at 1 (step S20), and the recording is executed from the recording start sector position (step S21). Since the recording of all sectors in the second frame has been completed in step S21, the LBA is incremented to start recording of the next frame (steps S22 to S24). After the above-mentioned processes are carried out, the operation returns again to step S4, and these processes are repeated until the number of recorded frames reaches the set number of frames to be recorded (steps S10 and S23).

As shown in FIG. 7(b) showing execution time at the recording of a DV signal on the disc surface, the above-mentioned information recording/reproducing method according to the second embodiment prevents such a situation as in the Prior Art 2 shown in FIG. 12(b) where the DV signal stored in a frame memory is always divided to be recorded, thereby reducing the recording time at the recording of the DV signal on the disc surface also in the case where the recording start sector is previously set at a sector position RS at which the recording can be started.

In this second embodiment, the description has been given of the case of recording, but also in the case of reproduction, the reproduction execution time can be reduced in a similar manner. Therefore, by employing the information recording/reproducing method according to the present invention both in the recording and reproduction, the overall recording/reproduction execution time in the information recording/reproducing apparatus can be reduced.

Embodiment 3

According to an information recording/reproducing method of a third embodiment of the present invention, in a data recording/reproducing method in a case where the type of a signal to be recorded is different from the DV signal and a recording start sector position is decided by detecting a recordable position on the basis of tracking information, when data stored in a memory is recorded with being divided, the subsequent data is recorded without being divided, and when the data is recorded without being divided, the subsequent data is recorded with being divided, thereby to eliminate a rotational delay that may occur after the data that is stored in the memory is recorded without being divided, avoid the increase in the recording execution time resulting from the rotational delay, and optimize the data recording execution time.

Figure 5:
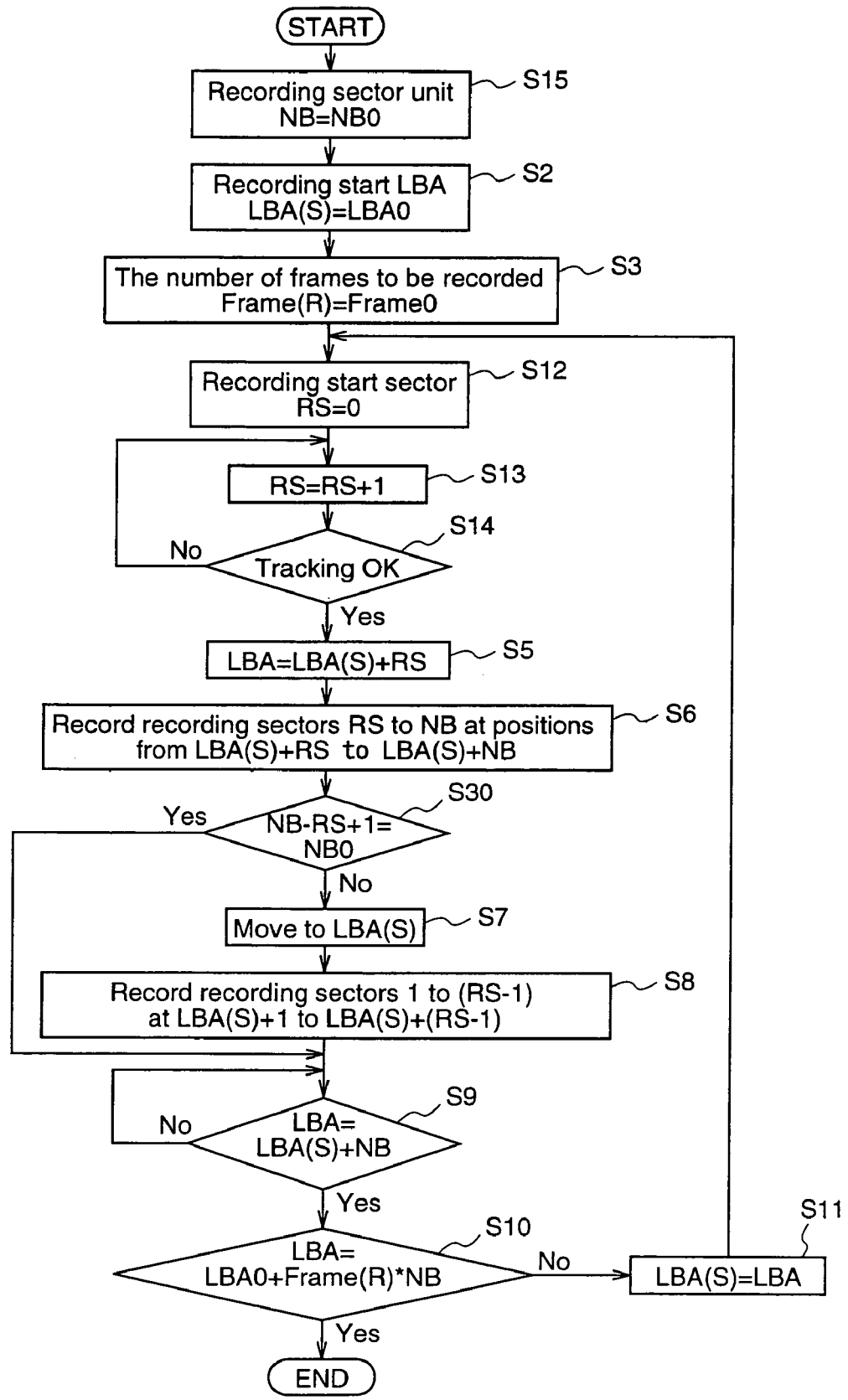
FIG. 5 is a flowchart showing a method for recording data of a type that is different from the DV signal in a case where a recording start sector position is decided by detecting a recordable position on the basis of tracking information, in an information recording/reproducing method according to a third embodiment of the present invention.

FIG. 5 is a flowchart showing a method for recording a signal of a type that is different from the DV signal in the information recording/reproducing method according to the third embodiment.

As shown in this figure, in step S15, the unit of recording sectors (NB) is set at the number of sectors in a signal to be recorded. In step S2, a recording start LBA is set. In step S3, the number of frames to be recorded is set. In step S12, a recording start sector position RS is set. In step S13, the recording start sector is incremented. Instep S14, completion of tracking is detected. In step 5, the LBA is located at a position at which recording of data can be started. In step S6, recording is carried out from the LBA position in step S5 at which the recording of data can be started, up to the sector NB. In step S30, it is judged whether all of NB0 sectors as many as the number of sectors in one frame have been recorded or not. In step S7, when the result of the judgement in step S30 indicates that there are any sectors that have not been recorded, the operation returns to the recording start LBA. In step S8, the remaining sectors that have not been recorded are recorded. In step S9, the LBA is set at a position at which recording of one frame has been finished. In step S10, it is judged whether all of the frames to be recorded as many as the number that has been set in step S3 have been recorded or not. In step S11, when the result of the judgement in step S10 indicates that not all of frames as many as the set number have been recorded, a LBA start position for recording the next frame is set.

Next, the operation of the information recording/reproducing method according to the third embodiment will be described with reference to FIG. 5.

The unit of recording sectors (NB) is set at NB0 that is equal to the number of sectors in one frame (step S15), and a LBA(S) as a recording start LBA is set (step S2). Then, the number of frames to be recorded (Frame(R)) is set (step S3), and thereafter a recording start sector position RS in the frame to be recorded (NB0) is set at 0 (step S12). Then, the sector position is incremented (step S13), and it is judged whether tracking has been completed or not (step S14). When the tracking has been completed, recording is started at that recording start sector position (steps S5 to S6). Thereafter, it is judged whether the number of recorded sectors is NB0 or not (step S30). When NB0 sectors have been all recorded, there is no sector which is to be recorded thereafter, and thus the operation proceeds to step S9, while when there are any sectors that have not been recorded, these unrecorded sectors that are located forward of the recording start sector are recorded thereafter (steps S7 to S8). These processes are repeated until the number of recorded frames reaches the set number of frames to be recorded (steps S9 to S11).

As shown in FIG. 7(c), also in cases where the type of the signal to be recorded is different from the DV signal and the number of sectors in the signal is different, the information recording/reproducing method according to the third embodiment prevents such a situation as in the Prior Art 3 shown in FIG. 12(c) (after the recording unit 2) where a rotational delay occurs after the data stored in the memory is recorded without being divided, thereby reducing recording execution time at the recording of data on the disc surface, like in the case of the DV signal.

In this third embodiment, the description has been given of the case of recording, but also in the case of reproduction, the reproduction execution time can be reduced in a similar manner. Therefore, by employing the information recording/reproducing method of the present invention both in the recording and reproduction, the overall recording/reproduction execution time in the information recording/reproducing apparatus can be reduced.

Embodiment 4

According to a fourth embodiment of the present invention, in an information recording/reproducing method in which the type of a signal to be recorded is different from the DV signal, a recordable sector position RS is previously decided, and the data is recorded with being divided, a case where data stored in a memory is recorded with being divided and a case where the data is recorded without being divided are alternately implemented to reduce recording time at continuous data recording.

Figure 6:
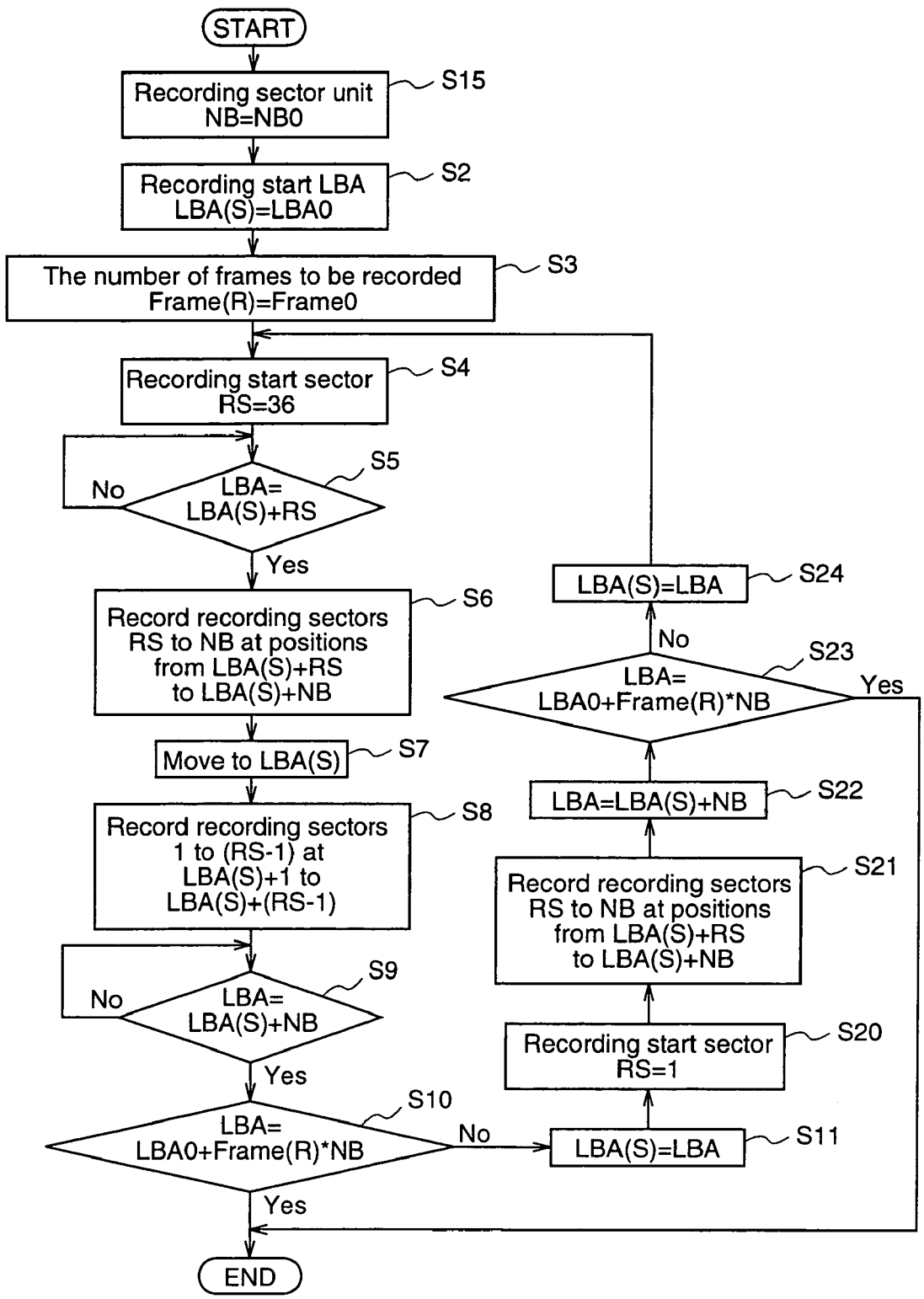
FIG. 6 is a flowchart showing a data recording method in a case where a recordable sector position is previously decided and data of a type that is different from the DV signal is divided to be recorded, in an information recording/reproducing method according to a fourth embodiment of the present invention.

FIG. 6 is a flowchart showing a method for recording a signal of a different type from the DV signal in the information recording/reproducing method according to the fourth embodiment.

As shown in this figure, in step S15, the unit of recording sectors is set at NB0 that is equal to the number of sectors in one frame. In step S2, a recording start LBA is set. In step S3, the number of frames to be recorded is set. In step S4, a recording start sector RS is previously decided. In this fourth embodiment, the recording start sector RS is set at sector 36. In step S5, a LBA for starting recording is set at the position of the recording start sector RS, which has been set in step S4. In step S6, recording from the sector 36 that has been set in step S4 up to the sector NB is carried out. In step S7, the LBA position is moved to the position of the recording start LBA which has been set in step S2, to record the remaining sectors which have not been recorded. In step S8, the remaining sectors that have not been recorded are recorded. By the above-mentioned processes, the first frame is all recorded.

Next, in step S9, the LBA is set at a position at which the recording of the first frame has been finished. In step S10, it is judged whether recording of frames as many as the number that has been set in step S3 has been finished, and the present LBA is located at that position or not. In step S11, when the result of the judgement in step S10 indicates that not all of the frames as many as the set number have been recorded, the recording start LBA is set at the LBA position in step S9, thereby to record the next frame, i.e., the second frame. In step S20, the sector position RS at which recording of the second frame can be started is set at 1. In step S21, all sectors in the second frame are recorded. In step S22, the present LBA is located at a position at which the recording of the second frame has been finished. In step S23, it is judged whether or not the present LBA is located at a position at which the recording of frames as many as the number that was set in step S3 has been finished. In step S24, when the result of the judgement in step S23 indicates that not all of frames as many as the set number have been recorded, the recording start LBA is set at the LBA position in step S22 to record the next frame, thereby preparing for the recording of the next frame.

Then, the operation of the information recording/reproducing method according to the fourth embodiment will be described with reference to FIG. 6.

Initially, the unit of recording sectors (NB) is set at NB0 that is equal to the number of sectors in one frame (step S15), and a LBA(S) as a recording start LBA is set (step S2). Then, the number of frames to be recorded (Frame(R)) is set (step S3), thereafter a recording start sector in the frame to be recorded (NB0 sectors) is previously set at a sector position RS at which recording can be started (step S4), and the recording is performed from the recording start sector position (steps S5 to S6). Then, sectors that are located forward of the recording start sector and have not been recorded are recorded thereafter (steps S7 to S8). After the first frame is recorded in this manner, the LBA is incremented to start recording of the second frame (steps S9 to S11). When the recording of the second frame is to be performed next, initially a sector position RS at which the recording can be started is set at 1 (step S20), and the recording is performed from this recording start sector position (step S21). Since recording of all sectors in the second frame has been completed in step S21, the LBA is incremented to start recording of the next frame (steps S22 to S24). After the above-mentioned processes are carried out, the operation returns to step S4 again, and these processes are repeated until the number of recorded frames reaches the set number (steps S10 and S23).

As shown in FIG. 7(d), also in cases where the type of the signal to be recorded is different from the DV signal and accordingly the number of sectors in the signal is different, the above-mentioned information recording/reproducing method according to the fourth embodiment prevents such a situation as in the Prior Art 4 of FIG. 12(d) where data stored in the memory is always divided to be recorded, thereby reducing recording execution time at the recording of data on the disc surface, as in the case of the DV signal.

In this fourth embodiment, the description has been given of the case of recording, but also in the case of reproduction, the reproduction execution time can be reduced in a similar manner. Accordingly, by employing the information recording/reproducing method of the present invention both in the recording and reproduction, the overall recording/reproduction execution time in the information recording/reproducing apparatus can be reduced.

Figure 7:
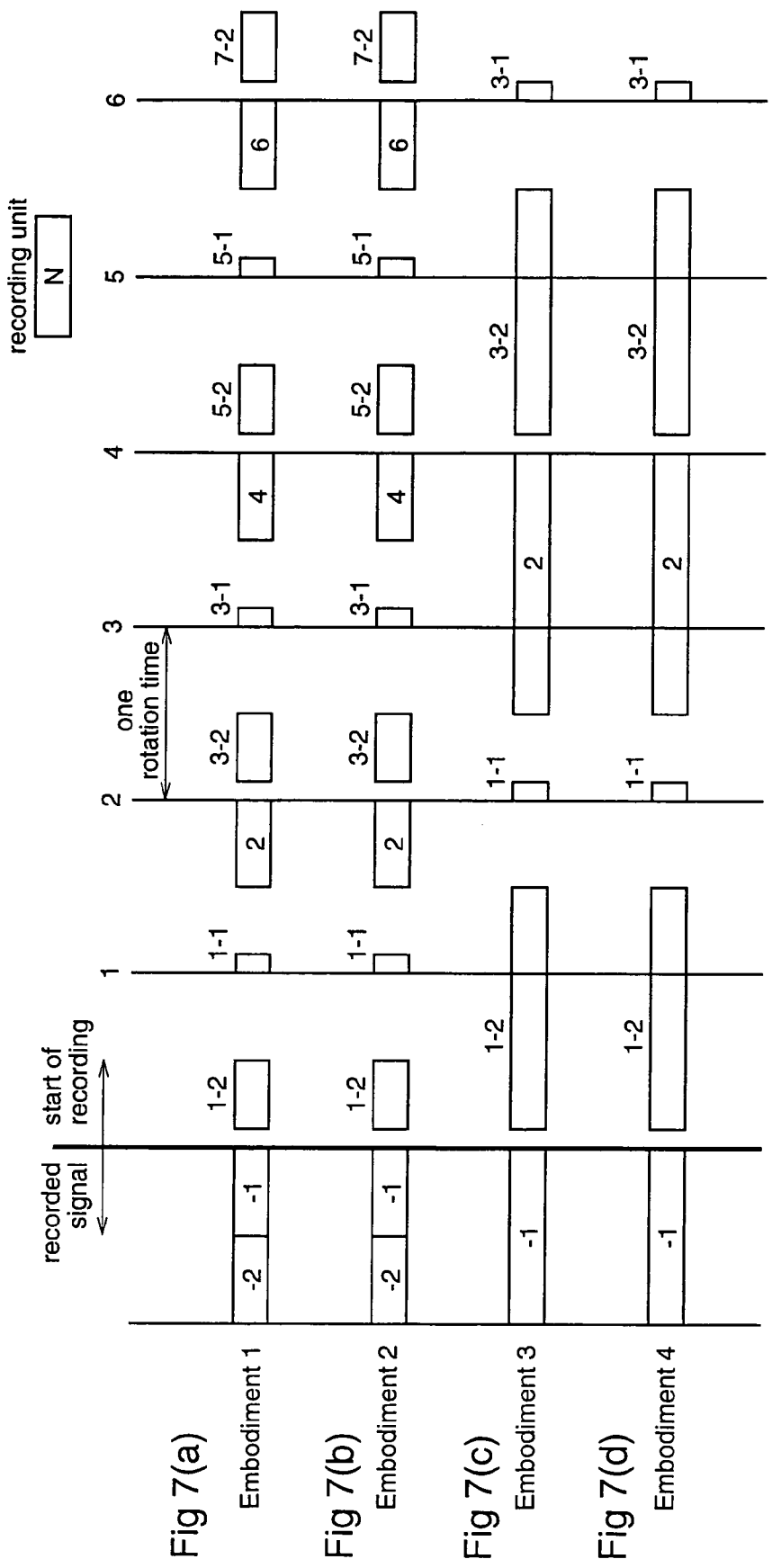
FIG. 7 are diagrams showing execution times in cases where signals are recorded by the information recording/reproducing method according to the present invention.
Figure 8:
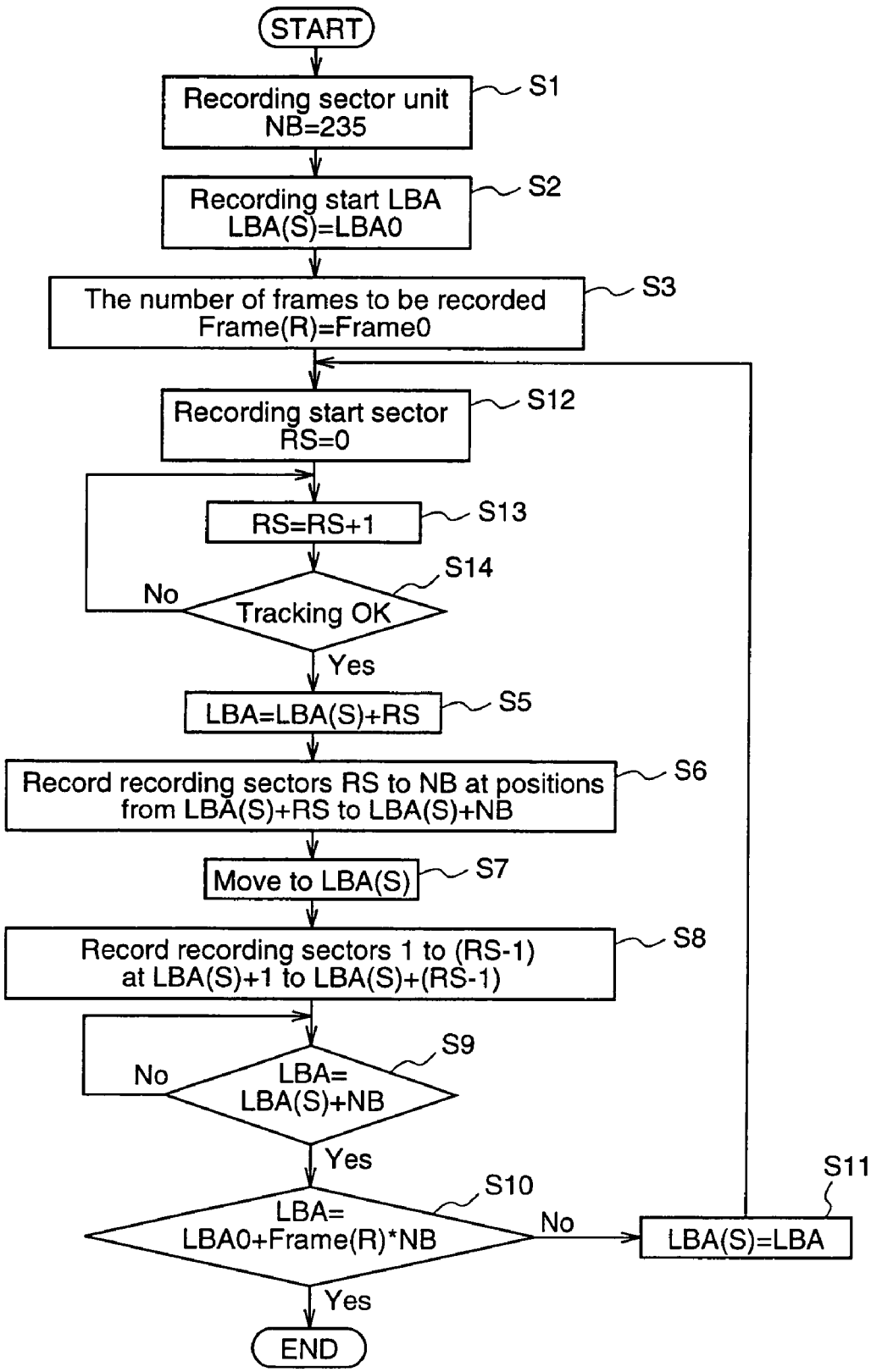
FIG. 8 is a flowchart showing a DV signal recording method in a case where a recording start sector position is decided by detecting a recordable position on the basis of tracking information, in a conventional information recording/reproducing method.
Figure 9:
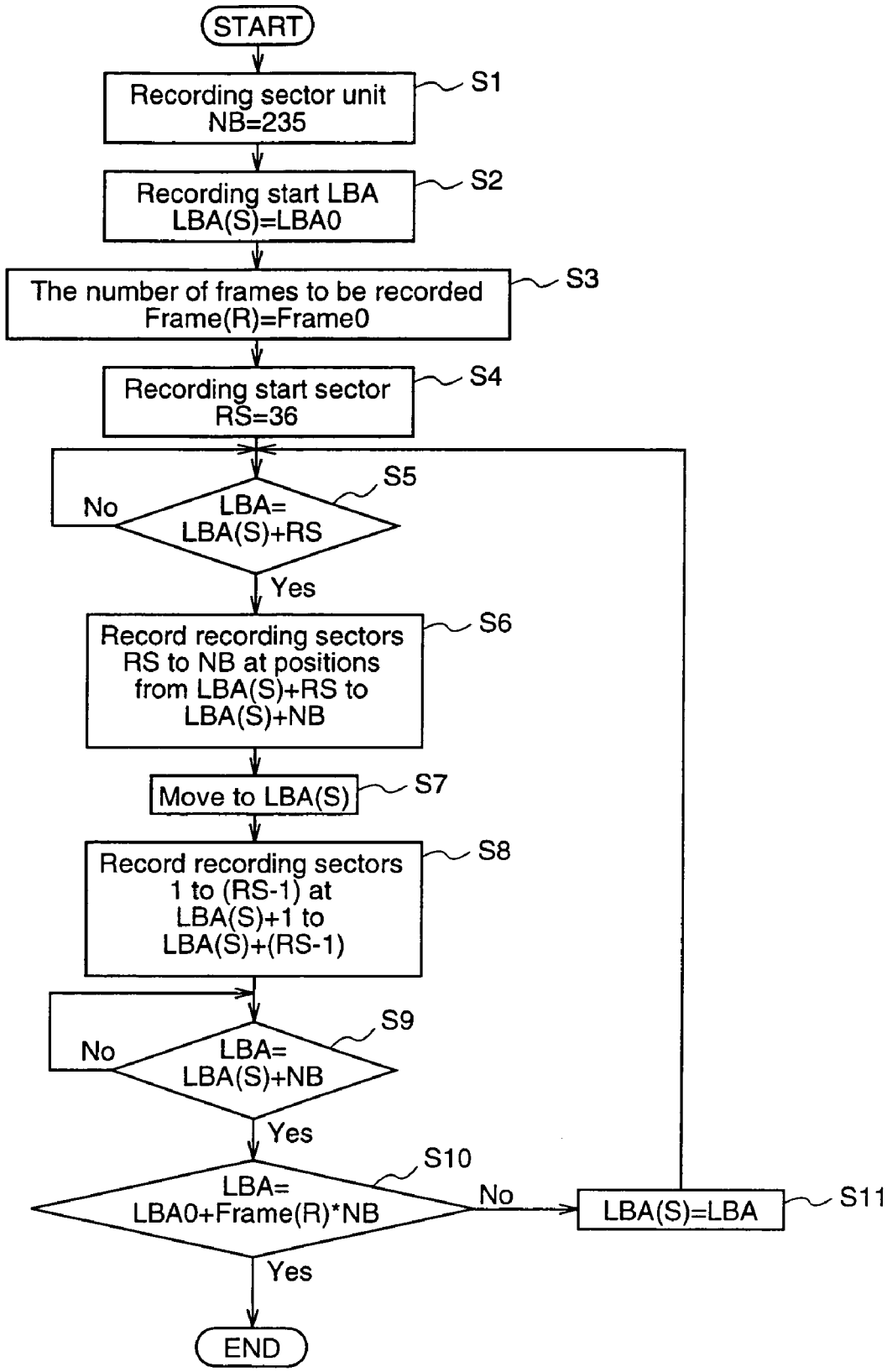
FIG. 9 is a flowchart showing a DV signal recording method in a case where a recordable sector position is previously decided and a DV signal is recorded with being divided, in a conventional information recording/reproducing method.
Figure 10:
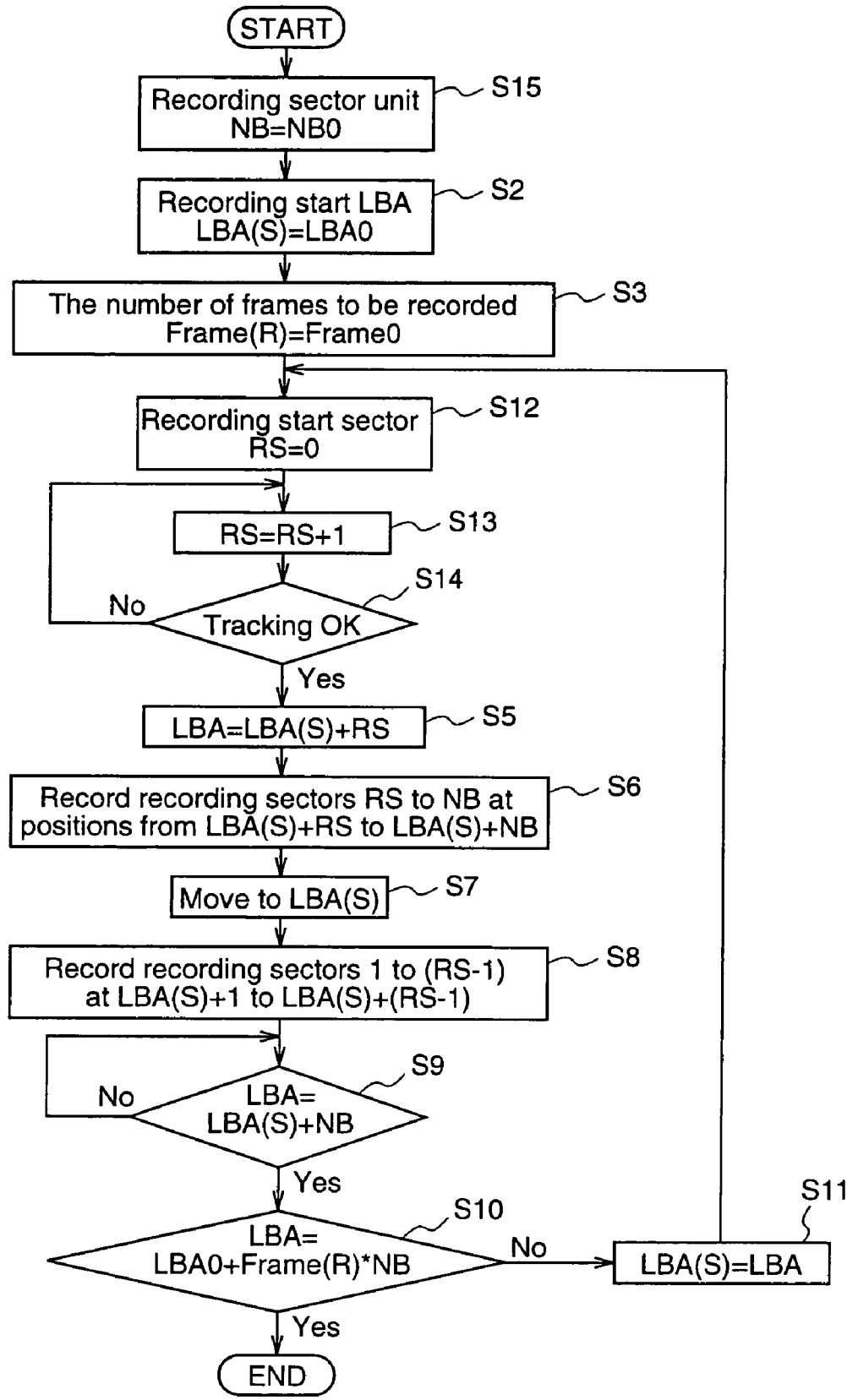
FIG. 10 is a flowchart showing a method for recording data of a type that is different from the DV signal in a case where a recording start sector position is decided by detecting a recordable position on the basis of tracking information, in a conventional information recording/reproducing method.
Figure 11:
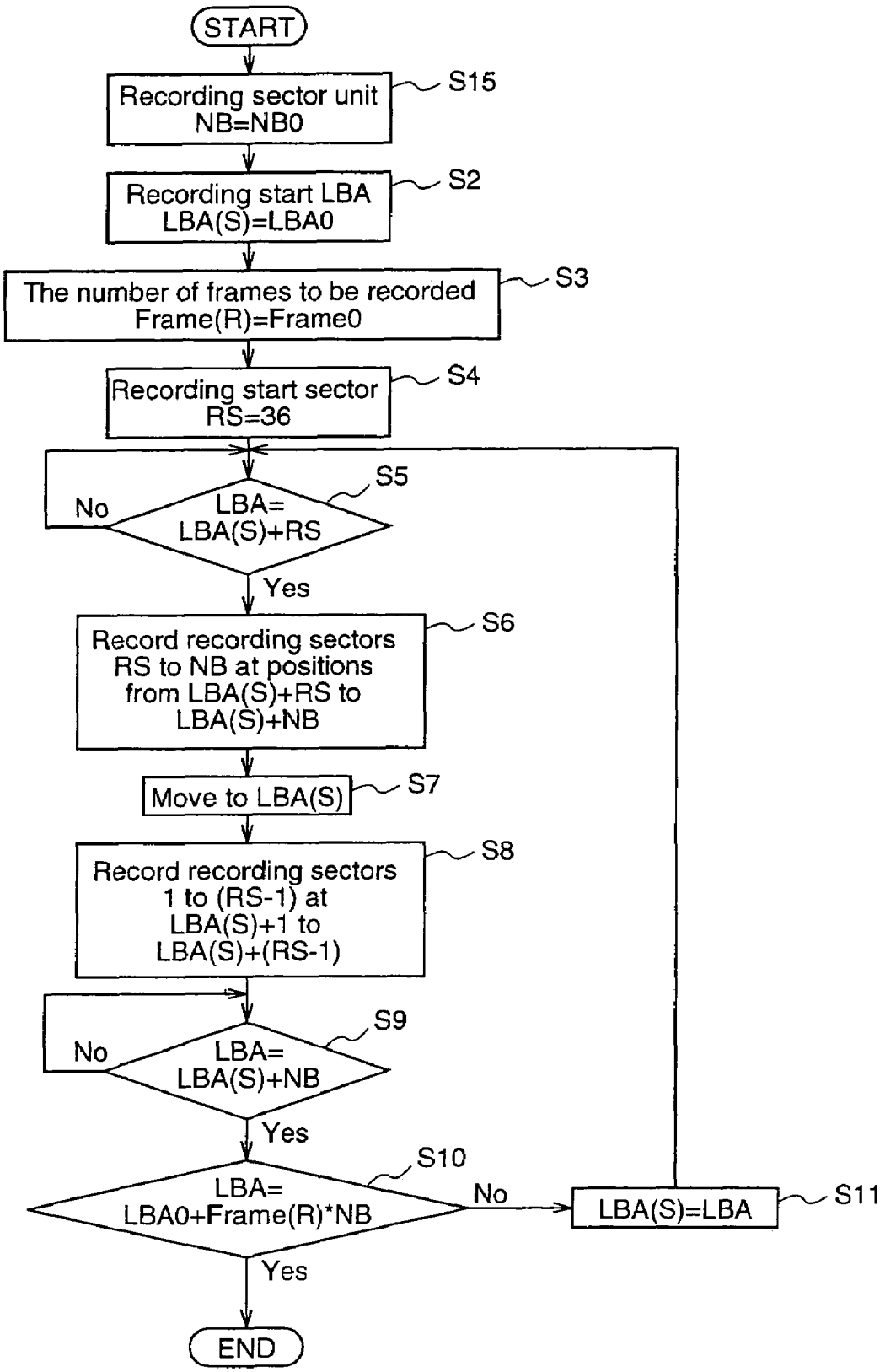
FIG. 11 is a flowchart showing a data recording method in a case where a recordable sector position is previously decided and data of a type that is different from the DV signal is recorded with being divided, in a conventional information recording/reproducing method.

Further, as for the information recording/reproducing method according to any of the first to fourth embodiments, in FIGS. 7 and 12, the already-recorded recording units are denoted by negative numbers, and when the recording unit is divided at the recording, the divided recording units are denoted by numbers with subscripts, such as 1-1 or 1-2.

INDUSTRIAL AVAILABILITY

As described above, the information recording/reproducing method according to the present invention can optimize recording or reproduction execution time for data that are stored in a memory. Accordingly, this information recording/reproducing method is useful for apparatuses that record or reproduce information on/from a disc information carrier, and this is especially suitable for uses in a disc device that records a video signal in a DV (Digital Video) format on a disc, or reproduces the DV format video signal from a disc on which the DV format video signal is recorded.

The invention claimed is:

1. An information recording/reproducing method for recording a DV (Digital Video) signal on a disc as an information recording medium, or reproducing the DV signal from the disc on which the DV signal is recorded, comprising:

handling the DV signal in units of frame, and temporarily storing the DV signals corresponding to the frames in a frame memory at the recording or reproduction;

detecting completion of tracking when a command is issued;

successively from a LBA (Logical Block Address) on the disc at which recording or reproduction of the DV signals is permitted, performing recording or reproduction of the DV signals corresponding to respective LBAs; and thereafter, for a part of the disc at which the recording or reproduction of the DV signals has not been performed, carrying out recording or reproduction operations for the DV signals corresponding to respective LBAs, wherein after the DV signal stored in the frame memory is recorded or reproduced with being divided, the subsequent DV signal is recorded or reproduced without being divided, and after the DV signal stored in the frame memory is recorded or reproduced without being divided, the subsequent DV signal is recorded or reproduced with being divided.

2. An information recording/reproducing method for recording a DV signal on a disc as an information recording medium, or reproducing the DV signal from the disc on which the DV signal is recorded, comprising:

handling the DV signal in units of frame, and temporarily storing the DV signals corresponding to the frames in a frame memory at the recording or reproduction;

previously setting a LBA at which recording or reproduction of the DV signal is started, at a value that is larger than a LBA at which a command is issued and the recording or reproduction of the DV signal is permitted;

from the set LBA on the disc, performing recording or reproduction of the DV signals corresponding to respective LBAs; and thereafter, for a part on the disc at which the recording or reproduction of the DV signals has not been performed, performing recording or reproduction of the DV signals corresponding to respective LBAs, wherein after the DV signal stored in the frame memory is recorded or reproduced with being divided, the subsequent DV signal is recorded or reproduced without being divided, and after the DV signal stored in the frame memory is recorded or reproduced without being divided, the subsequent DV signal is recorded or reproduced with being divided.

3. An information recording/reproducing method for recording data of a type that is different from a DV signal, on a disc as an information recording medium, or reproducing data from the disc on which the data of the different type from the DV signal is recorded, comprising:

temporarily storing the data in a memory;

detecting completion of tracking when a command is issued;

successively from a LBA on the disc at which recording or reproduction of data is permitted, performing recording or reproduction of data corresponding to respective LBAs; and thereafter, for a part on the disc at which the recording or reproduction of data has not been performed, performing recording or reproduction operations for data corresponding to respective LBAs, wherein after part of the data stored in the memory is recorded or reproduced with being divided, the subsequent data is recorded or reproduced without being divided, and after part of the data stored in the memory is recorded or reproduced without being divided, the subsequent data is recorded or reproduced with being divided.

4. An information recording/reproducing method for recording data of a different type from a DV signal on a disc as an information recording medium, or reproducing data of the different type from the DV signal, from the disc, comprising:

temporarily storing the data in a memory;

previously setting a LBA at which recording or reproduction of data is started, at a value that is larger than a LBA at which a command is issued and the recording or reproduction of data is permitted;

from the set LBA on the disc, performing recording or reproduction of data corresponding to respective LBAs; and thereafter, for a part on the disc, performing recording or reproduction of data has not been performed, performing recording or reproduction of data corresponding to respective LBAs, wherein after part of the data stored in the memory is recorded or reproduced with being divided, the subsequent data is recorded or reproduced without being divided, and after part of the data stored in the memory is recorded or reproduced without being divided, the subsequent data is recorded or reproduced with being divided.

* * * * *

UNITED STATES PATENT AND TRADEMARK OFFICE
CERTIFICATE OF CORRECTION

| | |
|---|---|
| PATENT NO. | : 7,263,281 B2 |
| APPLICATION NO. | : 10/250719 |
| DATED | : August 28, 2007 |
| INVENTOR(S) | : Hiroshi Kanda and Eiji Masuda |

It is certified that error appears in the above-identified patent and that said Letters Patent is hereby corrected as shown below:

*Column 14, line 24*: please change "performing" to --at which the--

Signed and Sealed this

Third Day of June, 2008

JON W. DUDAS
*Director of the United States Patent and Trademark Office*